(12) United States Patent
Kyrtsos

(10) Patent No.: US 6,496,102 B1
(45) Date of Patent: Dec. 17, 2002

(54) PASSIVE TAG WITH VARIABLE OUTPUT

(75) Inventor: Christos T. Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/190,487

(22) Filed: Nov. 12, 1998

(51) Int. Cl.[7] .................................................. H04Q 5/22
(52) U.S. Cl. ................... 340/10.1; 340/10.41; 340/453; 340/454
(58) Field of Search ...................... 340/10.1, 10.41, 340/453, 454

(56) References Cited

U.S. PATENT DOCUMENTS 5,673,018 A * 9/1997 Lowe et al. ................. 340/445
5,872,455 A * 2/1999 Pohribnij et al. ........... 324/509
5,900,803 A * 5/1999 Politz et al. .............. 340/525.5
6,087,930 A * 7/2000 Kulka et al. ................ 340/447

* cited by examiner

Primary Examiner—Michael Horabik
Assistant Examiner—M Shimizu
(74) Attorney, Agent, or Firm—Carlson, Gaskey & Olds

(57) ABSTRACT

A passive RF tag receives a number of varying inputs. The RF tag is preferably associated with a vehicle, and the inputs are indicative of diagnostic information from a vehicle braking system. The passive RF tag receives a signal from a transmitter that causes the RF tag to query the current status of the several inputs. The RF tag then sends a signal back to the transmitter/receiver indicative of the current status.

10 Claims, 2 Drawing Sheets

PASSIVE TAG WITH VARIABLE OUTPUT

BACKGROUND OF THE INVENTION

This invention relates to a passive RF information tag which provides status reports through a varying output.

Informational tags and RF transmitters are used in many applications. A first basic type of known tag is a so-called "active" tag which includes a power source. An active tag sends out a beacon signal. Such tags are utilized to identify the location of various items which carry the tag. These type tags may be utilized in inventory control, or in location monitoring.

Another type of tag does not include a power source, and does not send out a signal until it is queried by a transmitter. This type of tag is known as a "passive" tag. A passive tag is provided with a resonant circuit that receives a particular signal which activates its circuit. Typically, an RF transmitter sends a coded signal to the passive tag which then actuates the resonant circuit to provide a signal from the passive tag. Known passive tags obtain information from a fixed memory, and provide that information to the transmitter/receiver which has queried the tag. This type of system is utilized in identification applications. As one example, a garbage truck may include the transmitter/receiver, and dumpsters may include the passive tag. The memory in the dumpster tag would tell the transmitter/receiver the owner of the particular dumpster such that appropriate billing can be made.

The transmitter sends a signal to the passive tag which activates the resonant circuit. The passive tag queries the memory and sends a signal to the transmitter. The transmitter/receiver is then able to identify the owner of the dumpster carrying the tag.

These types of tags are being utilized in more and more applications. However, these types of tags have never been utilized to provide status or variable information.

More and more vehicle diagnostic systems are being provided by electrical components. Vehicle systems monitor brake wear, the amount of movement of an axle, such as an odometer application, the bumps experienced by an axle, etc. These types of diagnostic systems provide a simple electrical signal that is indicative of a problem, or provides information relative to how far the vehicle may have traveled, etc. These types of systems have never been used with the above described tag technology.

SUMMARY OF THE INVENTION

In a disclosed embodiment of this invention, a passive RF tag transmits a variable signal that provides information with regard to one or more systems associated with the tag. Preferably, the tag is a passive tag, and the passive tag is provided with a plurality of inputs. The passive tag is preferably associated with a vehicle, and several inputs are preferably diagnostic information from the vehicle.

As one example, a plurality of inputs to the passive tag may be in the form of switches which are either on or off. Thus, the passive tag will see a plurality of digital bits of information.

A switch associated with a brake wear lining may be actuated once a particular amount of brake wear has been experienced. Brake wear systems are known which provide an electronic signal when a predetermined amount of wear has occurred. The brake wear systems are known, and form no part of this invention. If the signal then actuates a switch to change the associated digital information from a zero to a one, the passive tag would then transmit the one to the querying transmitter/receiver. Similar systems may be associated with an accelerometer for monitoring bumps experienced by an axle, etc. Again, the diagnostic systems are known, it is the use of a tag to transmit the information which is inventive. The passive tag then stores these varying signals associated with each of the switches.

When the transmitter/receiver queries the passive tag, the digital information provided by the passive tag has now varied to include the switch which has moved to a closed state, and thus supplies a "1" as that associated bit. As a worker in this art knows, whether the "on" switch provides a "1" or a "0" is of no moment. It is the varying digital information which is the inventive portion of this application.

Other features provided by the passive tag include a stream of digital information that could be indicative of an analog amount. As an example, one of the inputs to the passive tag is associated with an electronic odometer for a particular axle. The use of electronic odometers is known, and forms no portion of this invention. However, the system could provide a output of the amount of travel for a particular axle through this passive tag. The passive tag would query a stored memory that would include information relating to the amount of travel, and could then transmit that information to the transmitter/receiver.

One other application of this invention would include the use of the passive tag to actuate a particular system. In this application, when the passive tag receives the query, and its circuit is actuated, it could first actuate a particular diagnostic system. As an example, a thermometer associated with a particular system could be actuated to provide a temperature measurement. If the temperature measurement exceeds a predetermined temperature, then an associated switch could be actuated. That associated switch would then be part of the output from the passive tag back to the transmitter/receiver.

The present invention provides a very low cost way of transmitting information about varying occurrences. One particularly advantageous application would be to provide information about diagnostic systems associated with a vehicle. The present invention lends itself well to use on vehicles, and thus provides benefits as outlined above and below.

These and other features of the present invention can be best understood from the following specification and drawings, the following of which is a brief description.

DETAILED DESCRIPTION OF A PREFERRED EMBODIMENT

Figure 1:
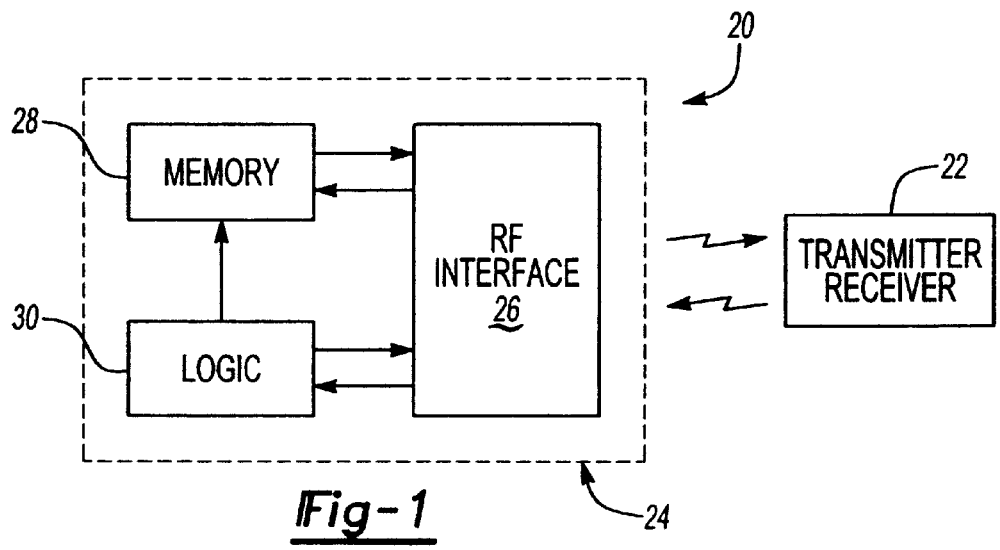
FIG. 1 shows a prior art passive tag.

FIG. 1 shows a prior art system 20 including a transmitter/receiver 22 communicating with a passive tag 24. The passive tag 24 includes an RF interface 26 including a resonant circuit. The resonant circuit is designed to correspond to the signal from the transmitter/receiver 22. If the appropriate signal is received by the RF interface, then the resonant circuit is actuated and a query goes to a memory 28.

The memory 28 provides prestored information to the interface 26 which is then transmitted back to the transmitter/receiver. Some associated logic 30 is also typically provided. This prior art system has been utilized to provide fixed or static information from a passive tag to a transmitter/receiver. As explained above, these systems have typically been utilized for identification purposes. Typically, a stream of digital bits is provided which provides an identification of the item carrying the tag 24.

Figure 2:
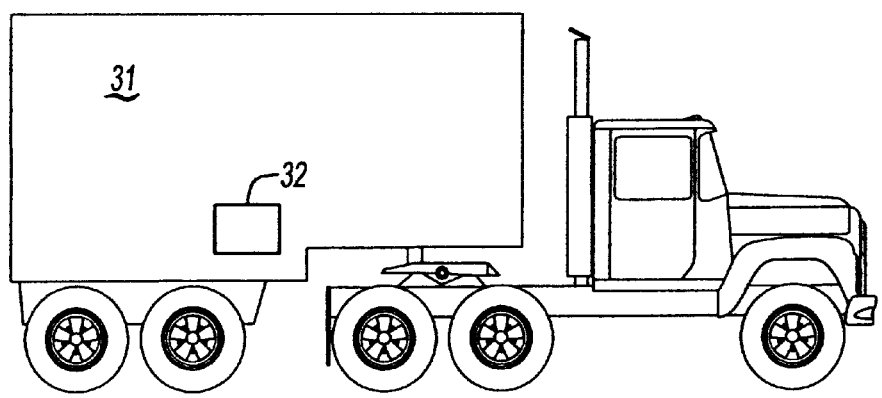
FIG. 2 is a schematic view of the vehicle incorporating the inventive system.
Figure 2:
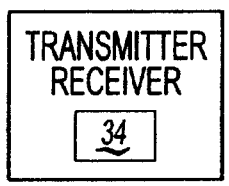

The present invention uses this known technology to provide variable information about the current state of a system associated with the tag. As shown in FIG. 2, a vehicle 31, shown here as a heavy truck, can be provided with a passive tag 32. The transmitter/receiver 34 gains information from the tag 32, as will be explained below. Transmitter/receiver 34 could also be on the vehicle.

Figure 3:
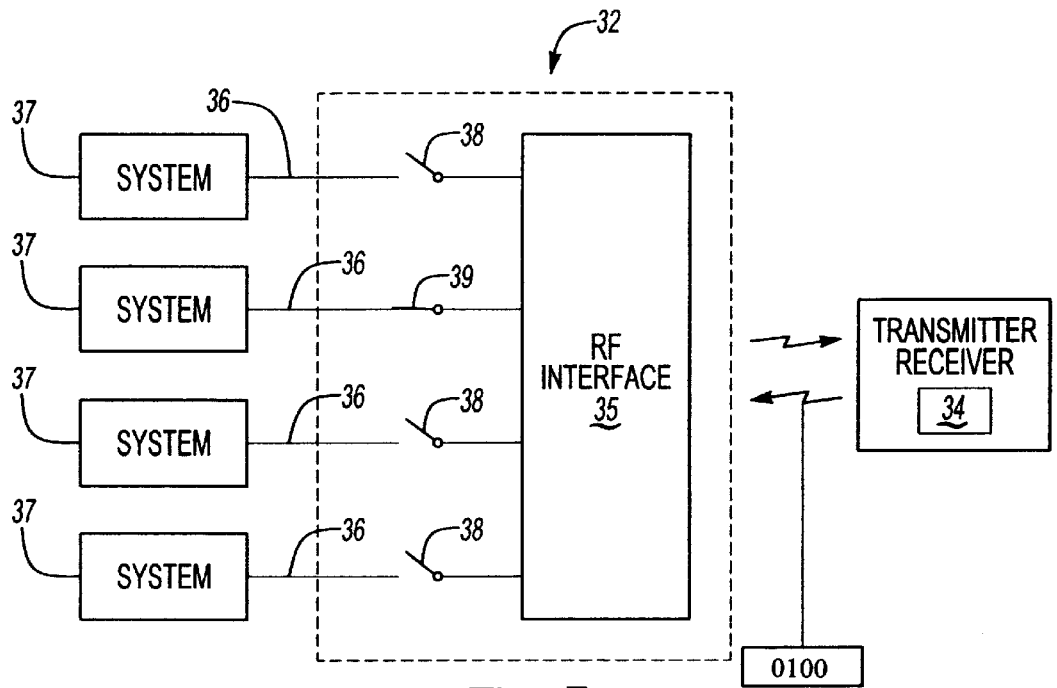
FIG. 3 schematic view of the inventive system.

As shown in FIG. 3, the tag 32 is provided with a series of inputs 36. The inputs 36 are of the sort that provide a digital signal to the interface 35 through a plurality of switches 38. Three of the four switches in FIG. 3 are shown open (38). A fourth switch 39 is shown closed. The switches may be actuated by the inputs 36 upon an occurrence associated with systems 37 associated with the inputs 36. As shown by way of example, each of the inputs 36 are associated with systems 37 on the vehicle 31. The systems may be, for example, a brake wear monitor, an accelerometer associated with an axle, an indication of the operation level of an ABS braking system, or other diagnostic information. When a predetermined level has been reached, then the inputs 36 actuate the switches 38 to move to the closed position 39. It should be understood that the opposite could occur. That is, the actuation by the inputs 36 could be to open the switches to the open position 38.

As an example, when the braking system has experienced sufficient wear that a signal should be sent to the operator, the switch 39 is closed.

The next time the transmitter/receiver 34 is utilized to query information from the passive RF tag 32, information is provided such as is shown in the small box in FIG. 3. As shown in the small box in FIG. 3, with the switch 39 closed, the information would be a series of bits including "0100". The "1" would be associated with the closed switch 39. An operator analyzing the information received by the receiver 34 would then know that the information relative to the wear on the brake has changed from its prior "0" status. This might indicate that servicing or maintenance of the associated system is in order.

These aspects of the invention provide a very low cost way of allowing an operator to easily query and obtain a good deal of information from the passive tag. The use of the passive tag is a very inexpensive way of providing this ability to query information, and also requires no power drain. As such, it is well suited to provide this role, and provides benefits over other ways of gathering information.

Figure 4:
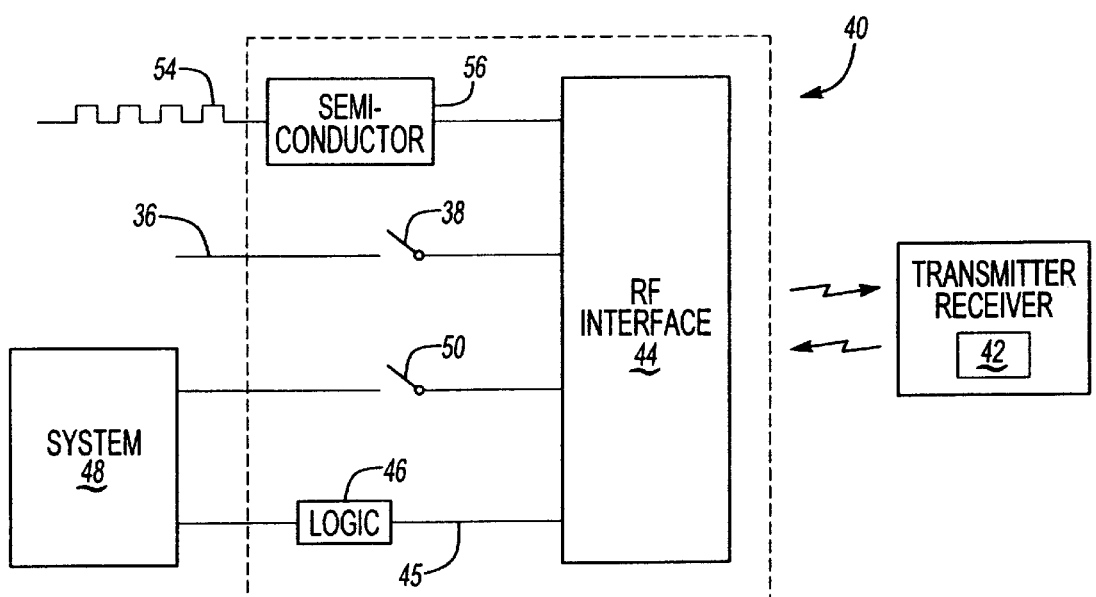
FIG. 4 shows a second embodiment of the inventive system.

FIG. 4 shows another embodiment tag 40. Tag 40 is queried by a transmitter/receiver 42. The RF interface 44 may be as known, and as described above. However, the RF interface 44 is also capable of providing an output 45 to a logic 46. The logic 46 actuates a system 48. This could be utilized to provide a inquiry status check. As an example, the system 48 could be a thermometer associated with a particular component on the vehicle which does not actively monitor that temperature. When the logic 46 sends the wake-up signal to the system 48, a temperature reading is taken. The temperature reading is then transmitted back through the line 50 to the switch 52. If the temperature reading is above a particular value, then the switch 52 may close, as in the prior embodiment. This aspect of the invention allows the RF tag to be providing not only information it receives, but also to actuate systems to gain additional information. This embodiment is also shown with an input 36 and switch 38 as in the prior embodiment, which could be incorporated for other systems which need not be actuated at the time of information transfer.

A further informational component is shown at 54, which graphically shows a cyclic rotation component that correlates to the turning of an axle on the vehicle 31. Electronic odometers are known which provide electronic signals associated with the amount of rotation of an axle. The information can be provided to a storage component such as a semi-conductor 56. The information provided by the passive tag 44 could be the amount of information stored in the semi-conductor 56. Again, this would vary as the rotation of the axle varies. The semi-conductor 56 would have an output that is not a single digital bit, but would instead be a stream of informational bits indicative of the total number of turns.

The present invention thus provides a very low cost way of providing an interface to an information gathering transmitter/receiver. The use of the passive tag and its ability to transmit information provides a low power, low cost way of providing this information.

Preferred embodiments of this invention have been disclosed; however, a worker of ordinary skill in this art would recognize that modifications come within the scope of this invention. For that reason, the following claims should be studied to determine the true scope and content of this invention.

What is claimed is:

1. A method of transmitting information from a vehicle comprising the steps of:
   (1) providing a passive tag on the vehicle, and providing inputs to said passive tag about the status of a vehicle braking system;
   (2) providing a change to said at least one input when the condition of said braking system changes, and querying said passive tag by a remote transmitter/receiver;
   (3) sending a wake-up signal from said passive tag to a diagnostic system, said diagnostic system performing a test of said vehicle braking system, said diagnostic system then sending an input to said passive tag indicative of the results of said test; and
   (4) said passive tag then providing an output signal indicative of the current status of said vehicle braking system.

2. A method as set forth in claim 1, wherein a plurality of inputs are directed into said passive tag, and said inputs are variable with conditions of said vehicle braking system, and said passive tags transmitting said plurality of inputs in step 3.

3. A method as set forth in claim 1, wherein said status is a digital output.

4. A method as set forth in claim 1, wherein said output includes a number of bits of information indicative of an analog value relating to the braking system.

5. The method of claim 1, wherein said step of providing an output signal indicative of the current status of said vehicle braking system in further defined by providing an output signal indicative of brake wear.

6. The method of claim 1, wherein said step of providing an output signal indicative of the current status of said vehicle braking system is further defined by providing an output signal indicative of an operation level of an ABS braking system.

7. A system including a tag for providing variable information concerning a vehicle braking system comprising:

an RF interface having an internal circuit for receiving a characteristic signal from a transmitter/receiver, said RF interface then sending a wake-up signal to a diagnostic system to perform a test of said vehicle braking system, said diagnostic system than sending an input indicative of the current state of at least one input of said vehicle braking system, said RF tag then sending said signal indicative of said current state of said at least one input, said at least one input being variable between at least two states, and said variable input changing with conditions on said braking system, said RF interface being operable to transmit a signal to said transmitter/receiver indicative of said current state of said input.

8. A system as recited in claim 7, wherein there are a plurality of said inputs, and each of said inputs are associated with said vehicle braking system, said inputs being changeable between a pair of digital states indicative of the condition of said braking system.

9. A system as recited in claim 8, wherein said RF interface sends a wake-up signal to an associated diagnostic system, said diagnostic system monitoring a condition and supplying an input back to said RF interface indicative of the current status of said system.

10. A system as recited in claim 9, wherein said at least one input includes a plurality of digital bits indicative of an analog value of said system.

* * * * *